(12) United States Patent
Whiteman

(10) Patent No.: US 10,829,906 B2
(45) Date of Patent: Nov. 10, 2020

(54) DRIVE MECHANISM FOR SKIDLOADER

(71) Applicant: Deere & Company, Moline, IL (US)

(72) Inventor: Steve R. Whiteman, Asbury, IA (US)

(73) Assignee: DEERE & COMPANY, Moline, IL (US)

(*) Notice: Subject to any disclaimer, the term of this patent is extended or adjusted under 35 U.S.C. 154(b) by 304 days.

(21) Appl. No.: 15/967,236

(22) Filed: Apr. 30, 2018

(65) Prior Publication Data
US 2019/0330822 A1 Oct. 31, 2019

(51) Int. Cl.
| | | |
|---|---|---|
| *E02F 9/20* | (2006.01) | |
| *B60K 17/10* | (2006.01) | |
| *E02F 9/22* | (2006.01) | |
| *F16H 55/10* | (2006.01) | |
| *F16D 13/52* | (2006.01) | |
| *F16D 21/00* | (2006.01) | |
| *F16H 47/02* | (2006.01) | |

(52) U.S. Cl.
CPC ............ *E02F 9/202* (2013.01); *B60K 17/105* (2013.01); *E02F 9/22* (2013.01); *F16D 13/52* (2013.01); *F16D 21/00* (2013.01); *F16H 47/02* (2013.01); *F16H 55/10* (2013.01)

(58) Field of Classification Search
CPC ........ B60K 17/14; B60K 17/145; B60K 1/00; E02F 9/202; F16D 21/00; F16D 13/52
See application file for complete search history.

(56) References Cited

U.S. PATENT DOCUMENTS

| | | | | |
|---|---|---|---|---|
| 4,407,381 | A * | 10/1983 | Oswald | B60K 17/342 180/24.12 |
| 4,962,821 | A | 10/1990 | Kim | |
| 5,429,543 | A * | 7/1995 | Tilbor | A63H 17/36 180/22 |
| 7,185,742 | B2 * | 3/2007 | Langen | B60K 7/0007 180/53.4 |
| 9,695,896 | B2 * | 7/2017 | Brandemuehl | B60K 17/36 |
| 2004/0121871 | A1 * | 6/2004 | Thompson | B62D 11/14 475/83 |
| 2009/0283345 | A1 * | 11/2009 | Kabrick | B60K 17/046 180/65.51 |
| 2015/0354685 | A1 * | 12/2015 | Versteyhe | B60K 17/344 74/720 |
| 2017/0089406 | A1 * | 3/2017 | Sparks | A01B 76/00 |

* cited by examiner

*Primary Examiner* — James A English
(74) *Attorney, Agent, or Firm* — Michael Best & Friedrich LLP

(57) ABSTRACT

A drive mechanism for a skidloader including multiple clutch packs, where each clutch pack selectively connects a drive motor to a corresponding wheel assembly via a unique drive path. More specifically, each drive path produces a unique drive ratio between the drive motor and the corresponding wheel assembly such that the drive mechanism is adjustable between a first drive configuration, in which the motor and wheel assembly are in operable communication via first drive path, a second drive configuration, in which the motor and wheel assembly are in operable communication via a second drive path, and a park configuration, in which the motor and the wheel assembly are in operable communication via both the first drive path and the second drive path.

17 Claims, 8 Drawing Sheets

DRIVE MECHANISM FOR SKIDLOADER

FIELD

The disclosure relates to skidloaders and more specifically skidloaders having an improved drive mechanism.

BACKGROUND

Skidloaders generally rely on a displacement change in a two-speed hydrostatic motor to provide multiple operating speed ranges. However, the pressure drop associated with the two-speed hydrostatic motors are generally inefficient and generate excessive heat that must be rejected by an oil cooler. Furthermore, changing displacements of a conventional two-speed hydrostatic motor can result in the vehicle freewheeling on a slope, or indexing during shifting. Still further two-speed hydrostatic motors can also operate differently dependent on current weather and temperature conditions.

SUMMARY

In one implementation, a drive mechanism including a frame, a motor coupled to the frame and having an output shaft rotatable about a motor axis, a drive axle mounted to the frame for rotation about an axle axis, a first drive path in operable communication with and establishing a first gear ratio between the output shaft and the drive axle, a second drive path in operable communication with and establishing a second gear ratio between the output shaft and the drive axle, the second gear ratio being different than the first gear ratio, a first clutch assembly adjustable between an engaged configuration, in which force is transmitted between the motor and the drive axle via the first drive path, and a disengaged configuration, in which force is not transmitted between the motor and the drive axle via the first drive path, and a second clutch assembly adjustable between an engaged configuration, in which force is transmitted between the motor and the drive axle via the second drive path, and a disengaged configuration, in which force is not transmitted between the motor and the drive axle via the second drive set.

In another implementation, a drive mechanism including a frame, a motor having a housing fixedly coupled to the frame and an output shaft rotatable with respect to the housing about a motor axis, and a drive axle mounted to the frame for rotation with respect thereto about a drive axis, where the drive axis is aligned with the motor axis, and wherein the output shaft and the drive axle rotate at different speeds.

In still another implementation, a skidloader including a frame, an axle housing coupled to the frame and defining a housing axis therethrough, and where the axle housing at least partially defines a housing volume therein, a drive axle rotatably mounted for rotation about the housing axis, where at least a portion of the drive axle is positioned within the housing volume, and a motor that includes a motor housing fixed relative to the axle housing and a drive shaft rotatable with respect to the motor housing about the motor axis, and where at least a portion of the motor housing is positioned within the housing volume.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
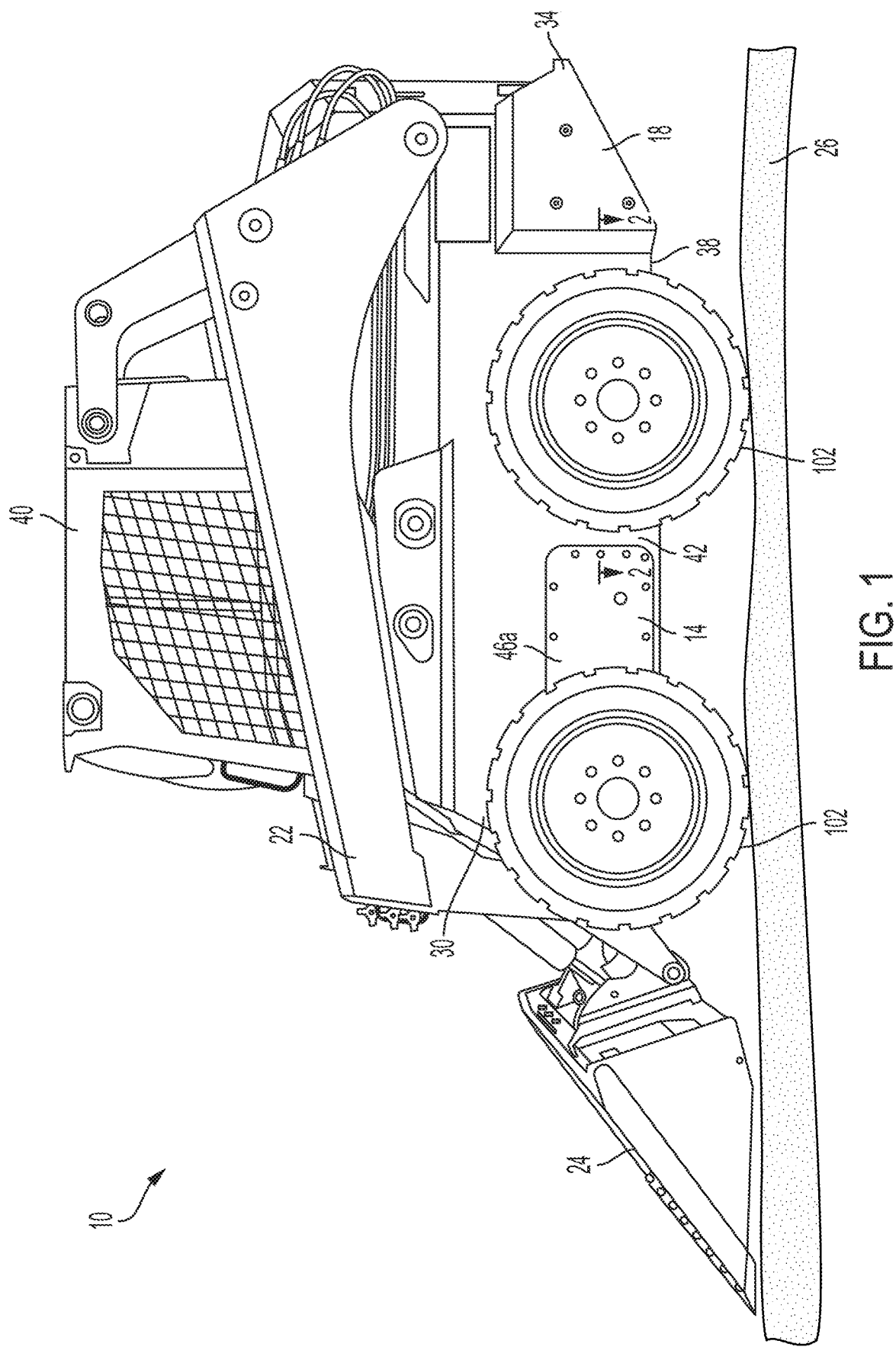
FIG. 1 is a side view of a skid-steer loader having an improved drive mechanism.

FIG. 1 illustrates a skid-steer loader 10 having an improved drive mechanism 14. More specifically, the improved drive mechanism 14 is configured to provide multiple speed ranges for a conventional skid steer vehicle without the deficiencies inherent in two-speed hydrostatic motors. For example, the present drive mechanism 14 allows for the use of a single, fixed displacement motor that can be optimized for efficiency in place of the relatively inefficient two-speed hydrostatic motor. Furthermore, the clutches and drive ratios of the drive mechanism 14 eliminates freewheeling, indexing during shifting, and performance variations due to weather conditions. Furthermore, the below illustrated drive mechanism 14 also includes a single chain on each side of the vehicle allowing for a narrower vehicle overall and more room under the cab.

More specifically, the loader 10 includes a body 18, a lift arm 22 coupled to and movable relative to the body 18, and a drive mechanism 14 coupled to the body 18 and configured to maneuver the loader 10 over a support surface 26 (e.g., the ground). In the illustrated implementation, the body 18 of the loader 10 includes a forward end 30, a rear end 34 opposite the forward end 30, a bottom plate or pan 38, and a roll-cage 40 at least partially enclosing a cab therein. The body 18 of the loader 10 also includes a pair of side rails 42, each extending from the pan 38 and oriented along the length of the loader 10 between the forward end 30 and the rear end 34.

Illustrated in FIG. 1, the lift arm 22 of the loader 10 is pivotably coupled to the body 18 proximate the rear end 34 and configured to rotate about a substantially horizontal axis between a lowered position and a raised position. In the illustrated implementation, the lift arm 22 includes a bucket 24 pivotably coupled to the distal end thereof that is configured to scoop and collect material. While the illustrated loader 10 includes a bucket, it is well known in the art for such loaders 10 to be adaptable to include a wide variety of labor-saving tools and attachments such as trenching tools, augers, snow blowers, and the like (not shown).

Illustrated in FIGS. 2-6, the drive mechanism 14 of the loader 10 includes a first or left-side drive assembly 46a, a second or right-side drive assembly 46b, a hydraulic system 48, and a control assembly 50. During operation, each drive assembly 46a, 46b is independently adjustable between a low-speed configuration, a high-speed configuration, a towing configuration, and a parking configuration. Each drive assembly 46a, 46b is further individually adjustable to produce different drive speeds (e.g., the speed at which the wheels 102 rotate) and different drive directions (e.g., forward and reverse). By individually adjusting each drive assembly 46a, 46b between the various operating configurations, the control assembly 50 is able to maneuver the loader 10 on the support surface 26 by generally using a "differential steering" or "skidsteer" technique.

The first drive assembly 46a of the drive mechanism 14 includes a first drive motor 54, one or more wheel assemblies 58 mounted to the body 18 of the loader 10, and a drive train 62 operatively coupling the drive motor 54 to one or more of the corresponding wheel assemblies 58. The first drive assembly 46a also includes a flexible drive member 66 extending between and in operable communication with each of the corresponding wheel assemblies 58. More specifically, the drive member 66 includes a chain or belt that engages the external teeth 70 (described below) of each wheel assembly 58 causing the wheel assemblies 58 to rotate together as a unit (see FIG. 3). In alternative implementations, the flexible drive member 66 may only be in operable communication with a subset of the wheel assemblies 58 of the first drive assembly 46a.

Figure 7:
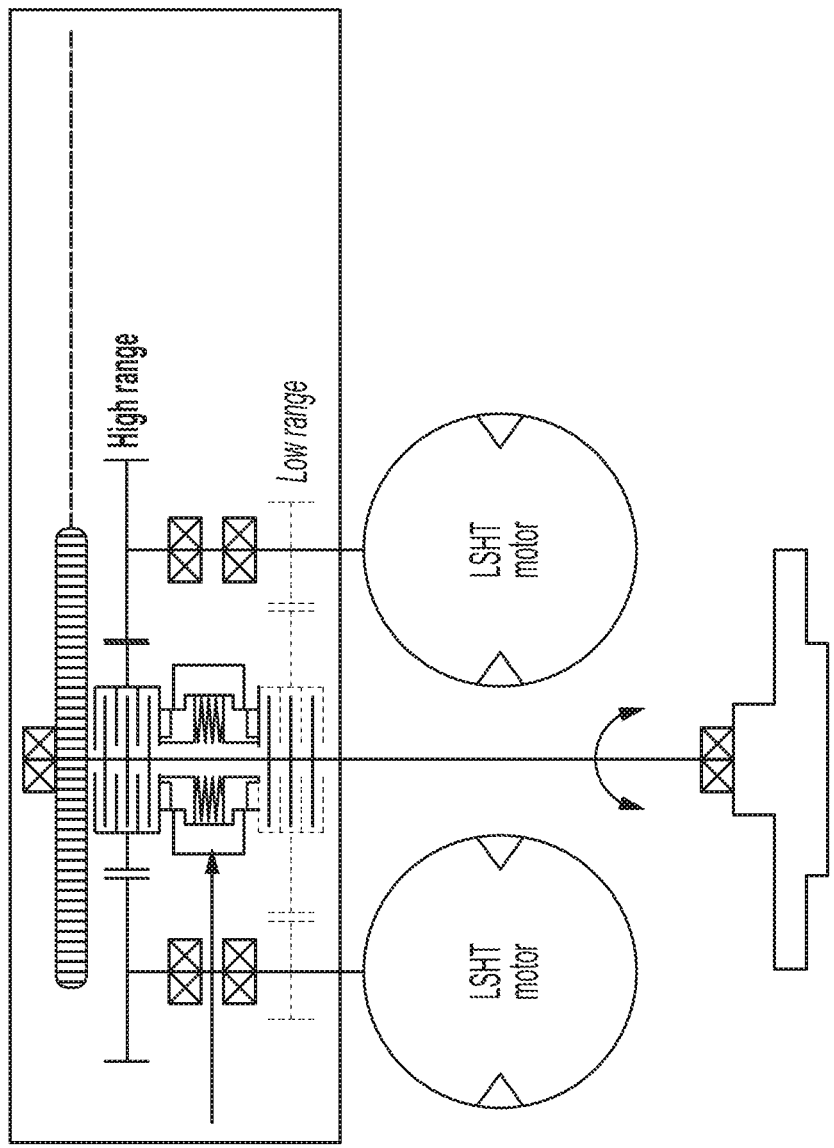
FIG. 7 is a schematic view of another implementation of the drive mechanism of the skid steer loader of FIG. 1.

In the illustrated implementation, the motor 54 of the first drive assembly 46a includes a housing or stator 74 fixedly mounted to the body 18 with a bracket 78, and an output shaft 82 rotatable with respect to the stator 74 about a motor axis 86. In the illustrated implementation, the motor 54 is an electric motor receiving electrical inputs from the control assembly 50 dictating the speed and direction at which the output shaft 82 rotates relative to the stator 74. However, in alternative implementations, the motor 54 may include a hydraulic motor in operable communication with the hydraulic system 48 and the like. In still other implementations, the drive motor 54 may include two or more motors operating together in parallel (see FIG. 7).

Figure 2:
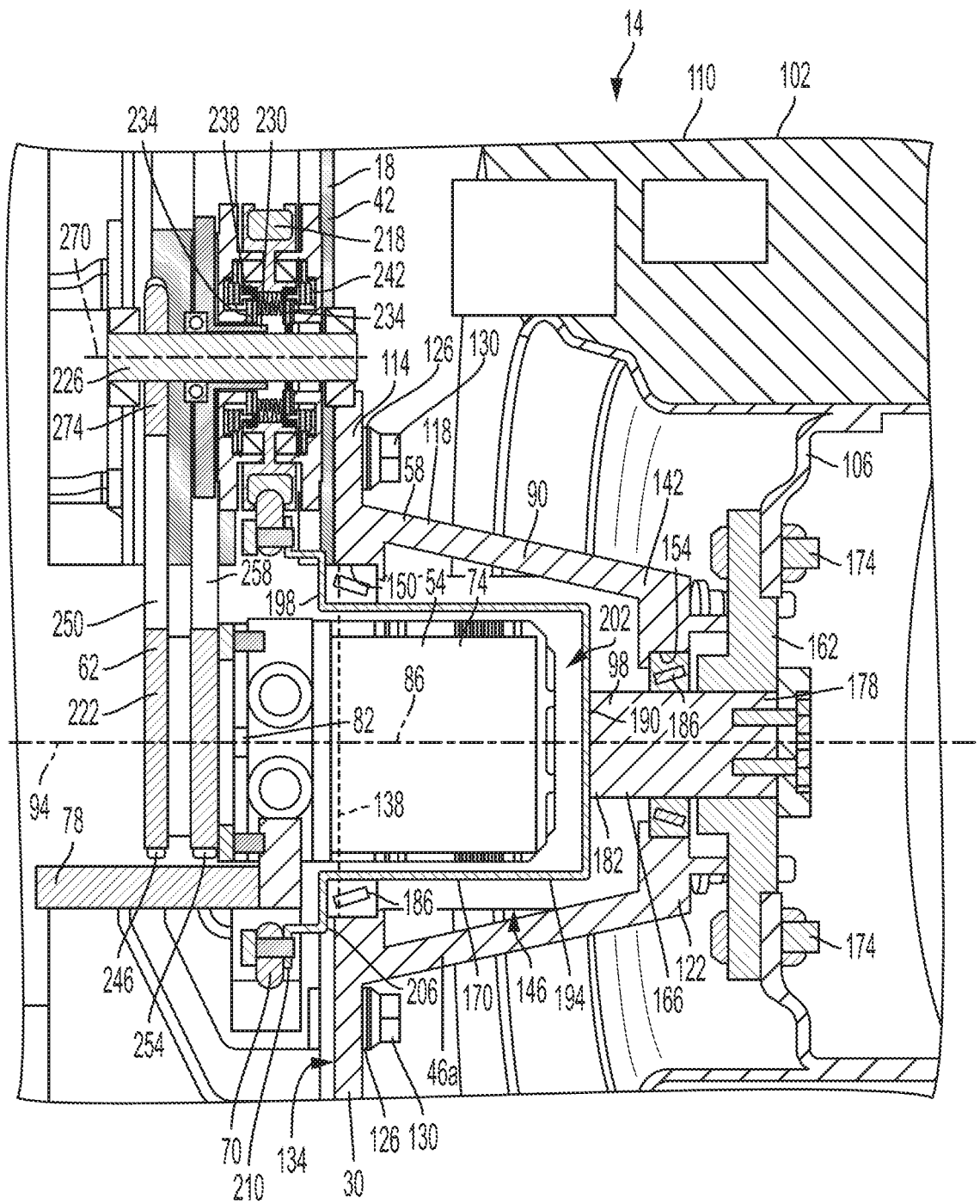
FIG. 2 is a section view taken along line 2-2 of FIG. 1.

Illustrated in FIG. 2, each wheel assembly 58 of the first drive assembly 46a includes an axle housing 90 fixedly coupled to a respective side rail 42 of the loader 10 to define a housing axis 94 therethrough, an axle 98 rotatably mounted to the axle housing 90 for rotation with respect thereto about the housing axis 94, and a wheel 102 coupled to and rotatable together with the axle 98. In the illustrated implementation, the first drive assembly 46a includes two wheel assemblies 58 (e.g., one wheel assembly 58 positioned proximate the forward end 30 and one wheel assembly 58 positioned proximate the rear end 34) that together with the second drive assembly 46b produce a standard four-wheel vehicle layout. However, in alternative implementations, more or fewer wheel assemblies 58 may be present as necessary.

Illustrated in FIG. 2, the wheel 102 of each wheel assembly 58 includes a rim 106 and a pneumatic tire 110 mounted on the rim 106 as is well known in the art. However, in alterative implementations, the wheel 102 may include a Mecanum-style wheel, a solid-formed wheel, or may include a sprocket to be used with a track system (not shown).

Figure 3:
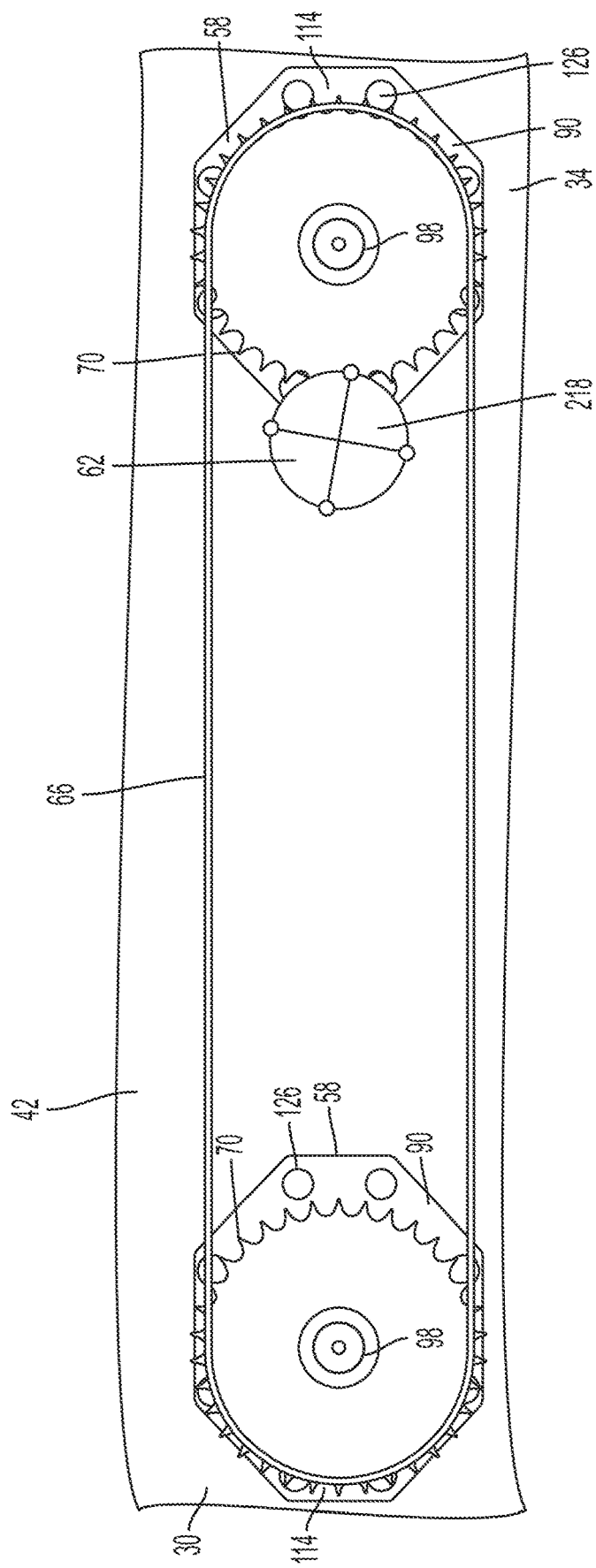
FIG. 3 is a schematic side view of the wheel assemblies of the first drive assembly of the skid-steer loader of FIG. 1.

The axle housing 90 of each wheel assembly 58 includes a base plate 114, and a body 118 extending from the base plate 114 to produce a distal end 122. As shown in FIGS. 2 and 3, the base plate 114 of the axle housing 90 defines a plurality of apertures 126, each configured to receive a fastener 130 therein to fixedly couple the axle housing 90 to the body 18 of the loader 10. The base plate 114 also defines a contact surface 134 configured to contact the body 18 of the loader 10 when the axle housing 90 is coupled thereto and a first plane 138 substantially coincident with the contact surface 134 (see FIG. 2).

The body 118 of the axle housing 90 is substantially conical in shape having an annular outer wall 142 that generally decreases in diameter as it extends axially away from the base plate 114 and toward the distal end 122 to at least partially define a housing volume 146 therein. The body 118 also includes a first bearing seat 150, positioned proximate the base plate 114 and concentric to the housing axis 94, and a second bearing seat 154, positioned proximate the distal end 122 and concentric to the housing axis 94. In the illustrated implementation, housing volume 146 of the body 118 is generally defined by the inner surface 158 of the body 118, the distal end 122, and the first plane 138.

Illustrated in FIG. 2, the axle 98 of the wheel assembly 58 includes a hub 162 forming a first end, a first axle portion 166 extending axially from the hub 162, and a second axle portion 170 extending axially from the first axle portion 166 opposite from the hub 162 to form a second end opposite the first end. During use, the hub 162, first axle portion 166, and second axle portion 170 all rotate together as a unit about the housing axis 94 relative to the axle housing 90 and are configured to transmit torque between the drive train 62 and the wheel 102 attached thereto.

Illustrated in FIG. 2, the hub 162 of the axle 98 is detachably couplable to the wheel 102 and configured to center the wheel 102 relative to the housing axis 94 while transferring torque thereto. In the illustrated implementation, the hub 162 is substantially disk-shaped having one or more studs 174 extending therefrom. However, in alternative implementations, different layouts and styles of hub 162 may be used to correspond with the specific type of wheel being used.

The first axle portion or shaft portion 166 of the axle 98 is substantially cylindrical in shape having a first end 178, and a second end 182 opposite the first end 178. When assembled, the first end 178 of the first axle portion 166 is joined to the hub 162, while the second end 182 is joined to the second axle portion 170 (described below). In the illustrated implementation, the outer diameter of the first axle portion 166 substantially corresponds with the inner race of the bearing 186 positioned in the second bearing seat 154.

The second axle portion or drum portion 170 of the axle 98 is substantially cylindrical in shape having an end wall 190, and an annular wall 194 extending axially from the end wall 190 away from the first axle portion 166 to produce an open end 198 and at least partially define an axle volume 202 therein. As shown in FIG. 2, the open end 198 of the annular wall 194 includes a series of stepped segments 206 that extend radially outwardly to produce an annular ridge 210. In the illustrated implementation, the annular wall 194 of the second shaft portion 170 includes an outer diameter that substantially corresponds with the inner race of the bearing 186 positioned in the first bearing seat 150.

In the illustrated implementation, the axle volume 202 is sized to permit at least a portion of the first drive motor 54 to be positioned therein. More specifically, the stator 74 of the motor 54 is at least partially positioned within the axle volume 202 such that at least a portion of the motor 54 axially aligns with at least a portion of the axle 98. Stated differently, the motor 54 is at partially positioned between the first end and the second end of the axle 98. Still further, the motor 54 is positioned such that the motor axis 86 aligns with the housing axis 94 while rotating at different speeds.

The axle 98 also includes a set of external teeth 70 configured to operatively engage the output gear 218 of the drive train 62 (described below) and the flexible drive member 66. In the illustrated implementation, the external teeth 214 are formed separately on a sprocket body that, in turn, is coupled to the annular ridge 210 of the second axle portion 170. However, in alternative implementations the external teeth 214 may be integrally formed with the axle 98.

Figure 4:
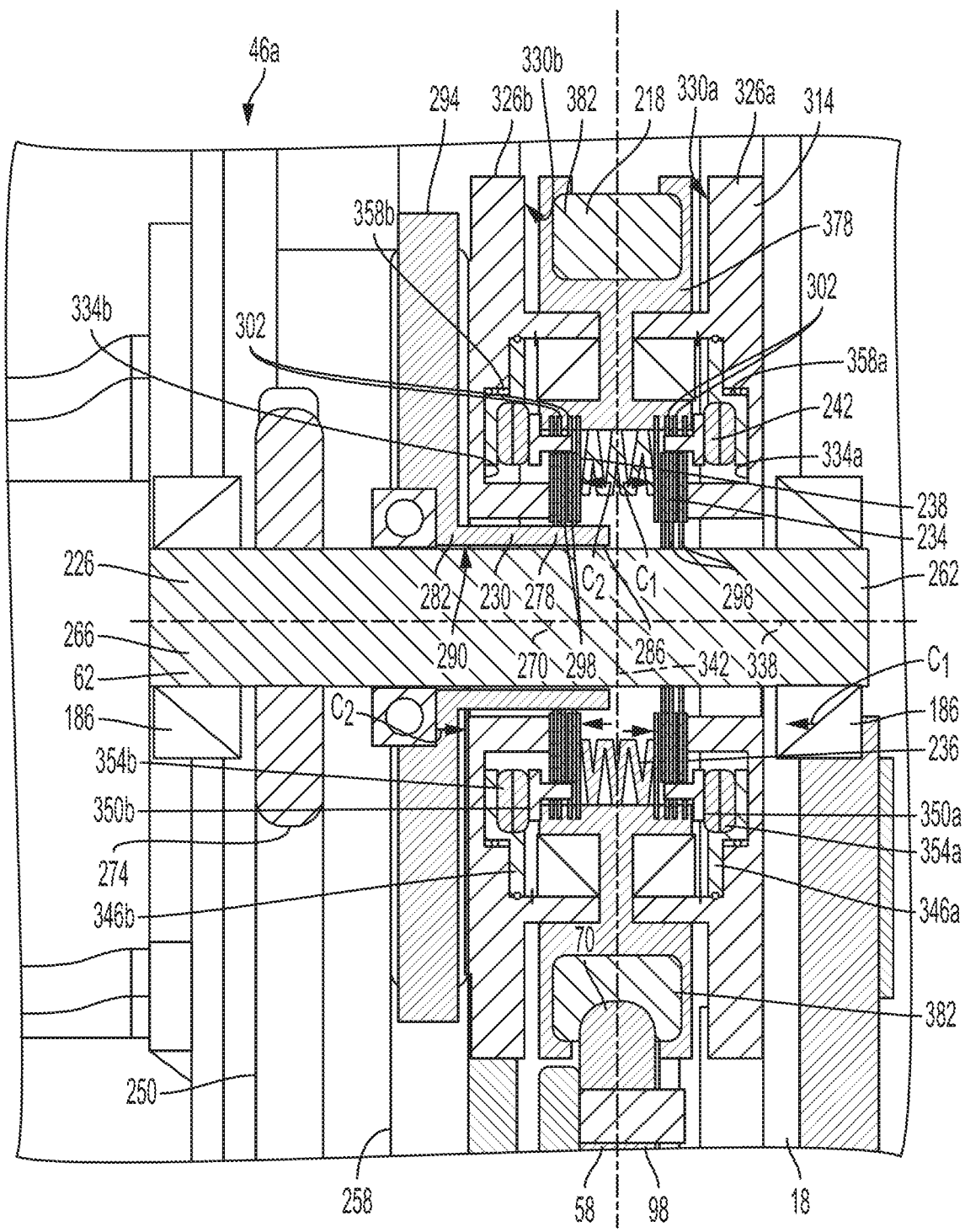
FIG. 4 is an enlarged view of the clutch assembly of the first drive assembly of FIG. 2.

Illustrated in FIGS. 2 and 4, the drive train 62 of the first drive assembly 46a includes an input gear 222, a first shaft 226 driven by the input gear 222 at a first rotational speed, and a second shaft 230 driven by the input gear 222 at a second rotational speed different than the first rotational speed. The drive train 62 also includes an output gear 218 in operable communication with one or more of the wheel assemblies 58 (described above), a first clutch pack 234 extending between and selectively coupling the output gear 218 with the first shaft 226, a second clutch pack 238 extending between and selectively coupling the output gear 218 with the second shaft 230, and a clutch actuation assembly 242 in operable communication with the first clutch pack 234 and the second clutch pack 238. In the illustrated implementation, the first shaft 226 and the second shaft 230 rotate in the same direction.

The input gear 222 of the drive train 62 is coupled to and rotates together with the output shaft 82 of the motor 54 and is configured to drive the first shaft 226 and the second shaft 230. The input gear 222 includes two sets of exterior teeth, a first set of external teeth 246 configured to engage a first flexible drive member 250 in operable communication with the first shaft 226, and a second set of external teeth 254 configured to engage a second flexible drive member 258 in operable communication with the second shaft 230. In the illustrated implementation, each set of exterior teeth 246, 254 includes sprocket teeth configured to engage a corresponding roller chain. However, in alternative implementations, one or both of the exterior teeth 246, 254 may include gear teeth, a belt pulley, and the like.

The first shaft 226 of the drive train 62 is substantially cylindrical in shape having a first end 262, and a second end 266 opposite the first end 262. Once assembled, the first shaft 226 is rotatably supported by a pair of bearings 186 for rotation about a shaft axis 270 at the first speed. In the illustrated implementation, the shaft axis 270 is offset from and substantially parallel to the housing axis 94.

The first shaft 226 also includes a third set of external teeth 274 configured to engage the first flexible drive member 250 and transfer torque therebetween. In the illustrated implementation the third set of external teeth 274 are formed into a separate body that is fixedly coupled (e.g., press fit) onto the first shaft 226 such that the external teeth 274 and the first shaft 226 to rotate together as a unit. However, in alternative implementations the external teeth 274 may be formed integrally with the shaft 226 itself. In the illustrated implementation, the external teeth 274 of the first shaft 226 include sprocket teeth configured to engage a corresponding roller chain, while in alternative implementations, the external teeth 274 may include gear teeth, a belt pulley, and the like.

The second shaft 230 of the drive train 62 is substantially cylindrical in shape having a body 278 with a first end 282, a second end 286 opposite the first end 286, and defining a channel 290 extending therethrough. During operation, the second shaft 230 is mounted for rotation about the shaft axis 270 and configured to rotate at a second speed that is different than the first speed.

The second shaft 230 also includes a fourth set of external teeth 294 configured to engage the second flexible drive member 258 and transfer torque therebetween. In the illustrated implementation, the external teeth 294 are formed integrally with the body of the second shaft 230. However, in alternative implementations the external teeth 294 may be formed separately and fixedly coupled thereto. Furthermore, the external teeth 294 of the second shaft 230 includes sprocket teeth configured to engage a corresponding roller chain, while in alternative implementations, the external teeth 294 may include gear teeth, a belt pulley, and the like.

In the illustrated implementation, the channel 290 of the second shaft 230 includes an interior diameter that substantially corresponds to the exterior diameter of the first shaft 226. As such, the first shaft 226 can be co-axially nested within the second shaft 230 while allowing relative rotation therebetween.

As shown in FIG. 4, the pitch diameter of the third set of external teeth 274 is different (e.g., smaller) than the pitch diameter of the fourth set of external teeth 294 causing the second shaft 230 to rotate at a second speed that is different (e.g., slower) than the first speed at which the first shaft 226 rotates. Stated differently, the gear ratio produced between the first set of external teeth 246 and the third set of external teeth 274 is different than the gear ratio produced between the second set of external teeth 254 and the fourth set of external teeth 294.

The first clutch pack 234 of the drive train 62 extends between and is in operable communication with the first shaft 226 and the output gear 218 to selectively transmit force therebetween. The first clutch pack 234 includes a plurality of clutch disks 298 coupled to and rotatable together with the first shaft 226, a plurality of clutch plates 302 coupled to and rotatable together with the output gear 218, and an end plate 306a. When assembled, the clutch disks 298 and clutch plates 302 are stacked axially in an alternating pattern with the end plate 306a positioned on one end.

Figure 5A:
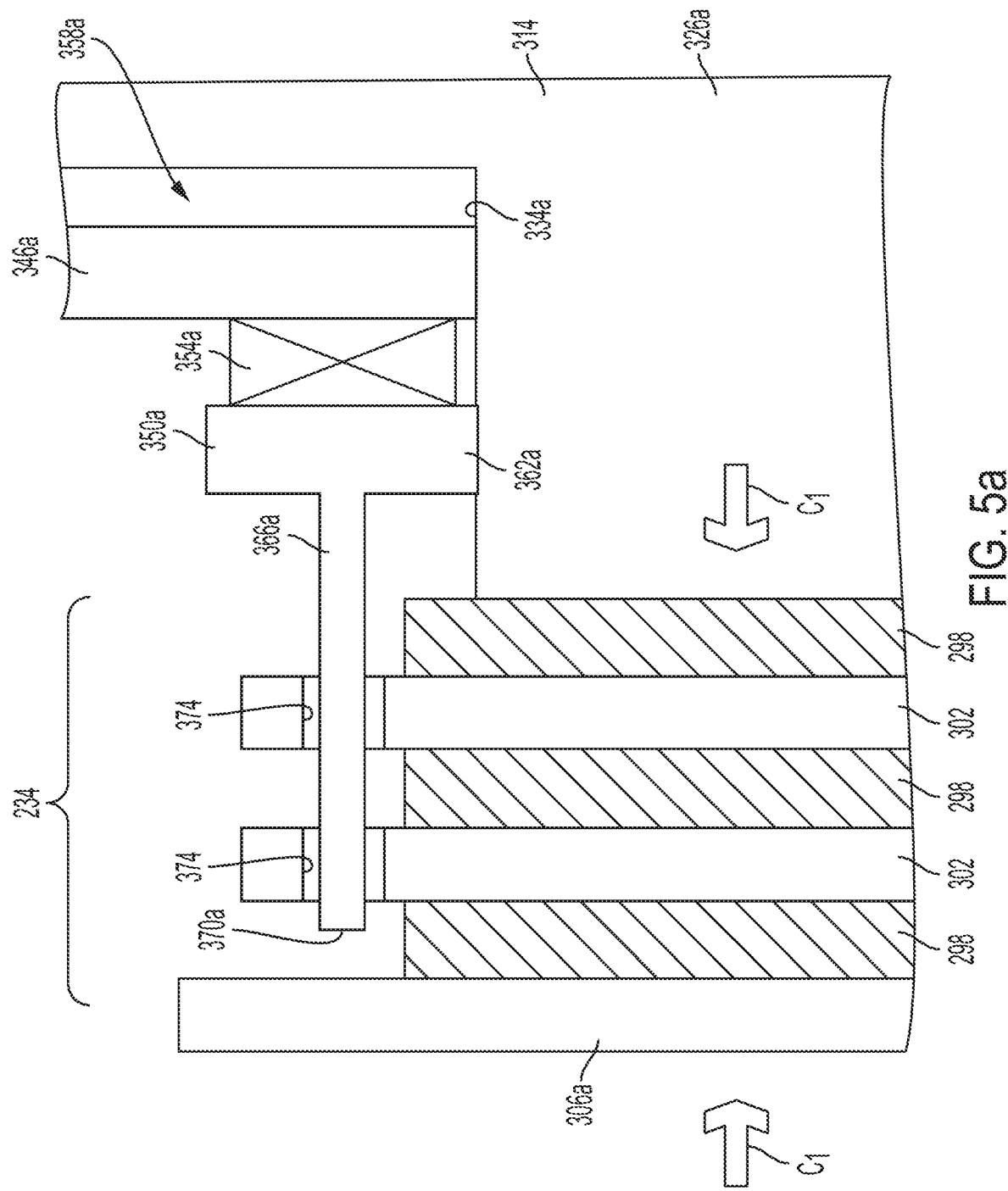
FIG. 5a is an enlarged view of the first clutch pack of the clutch assembly of FIG. 4 with the clutch pack in an engaged configuration.
Figure 5B:
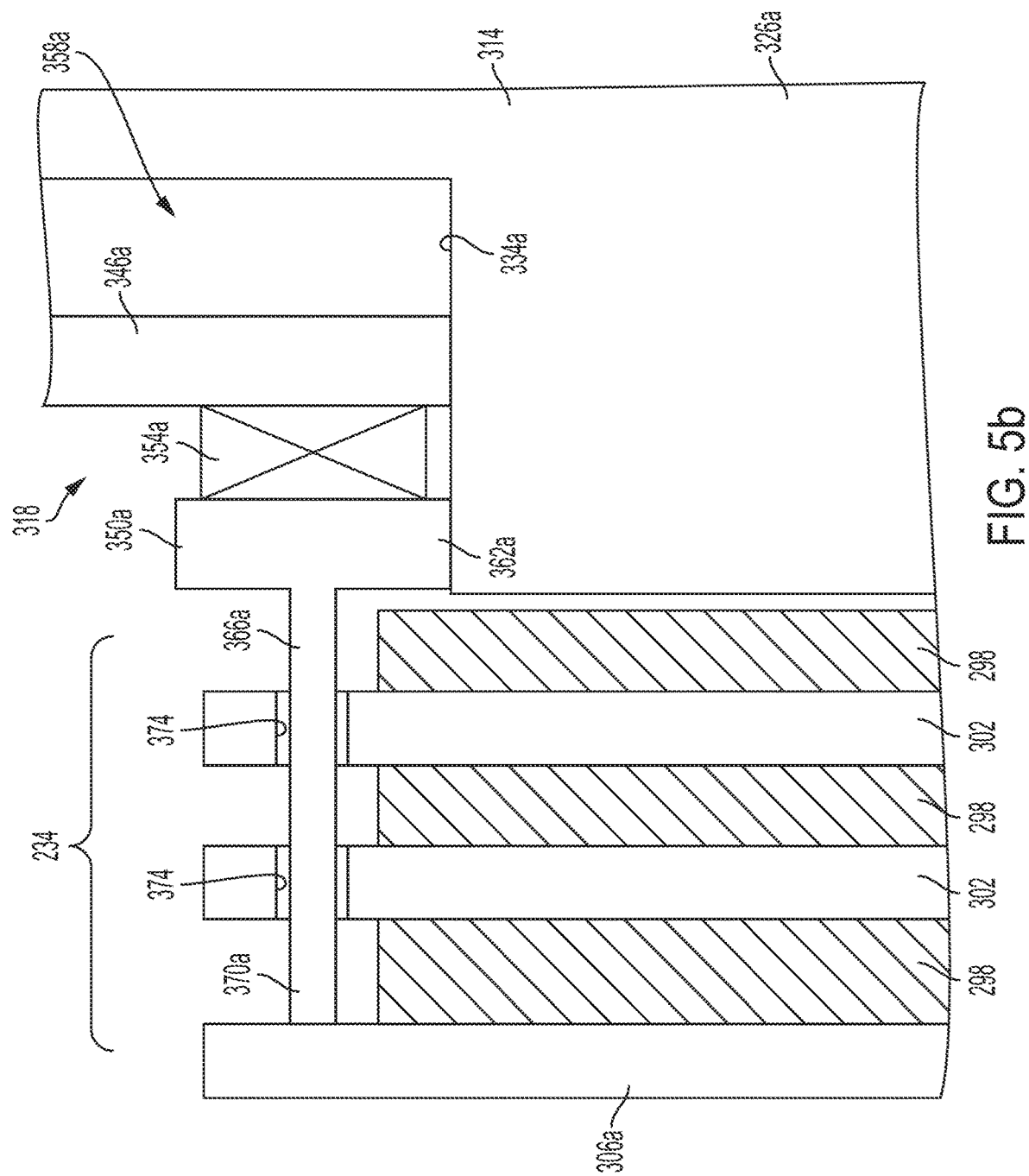
FIG. 5b is an enlarged view of the first clutch pack of FIG. 5a with the clutch pack in a disengaged configuration.

During operation, the first clutch pack 234 is adjustable between an engaged configuration and a disengaged configuration by applying and removing a compressive force thereto (see FIGS. 5a and 5b). More specifically, applying a compressive force to the first clutch pack 234 (e.g., via the first end plate 306a) causes the clutch disks 298 and clutch plates 302 to frictionally engage one another and transmit a force between the first shaft 226 and the output gear 218. In contrast, removing the compressive force substantially eliminates the frictional engagement between the clutch disks 298 and the clutch plates 302 such that the first clutch pack 234 does not transmit force between the first shaft 226 and the output gear 218.

The second clutch pack 238 of the drive train 62 extends between and is in operable communication with the second shaft 230 and the output gear 218 to selectively transmit force therebetween. The second clutch pack 238 includes a plurality of clutch disks 298 coupled to and rotatable together with the second shaft 230, a plurality of clutch plates 302 coupled to and rotatable together with the output gear 218, and a second end plate 306b. When assembled, the clutch disks 298 and the clutch plates 302 are stacked axially in an alternating pattern with the end plate 306b positioned on one end.

During operation, the second clutch pack 238 is adjustable between an engaged configuration and a disengaged configuration by applying and removing a compressive force thereto. More specifically, applying a compressive force to the second clutch pack 238 (e.g., via the second end plate 310) causes the clutch disks 298 and clutch plates 302 to frictionally engage one another and transmit a force between the second shaft 230 and the output gear 218. In contrast, removing the compressive force eliminates the frictional engagement between the clutch disks 298 and the clutch plates 302 such that the second clutch pack 238 does not transmit force between the second shaft 230 and the output gear 218.

The clutch actuation assembly 242 of the drive train 62 includes a frame 314, a first plunger assembly 318a in operable communication with the first clutch pack 234, a second plunger assembly 318b in operable communication with the second clutch pack 238, and a clutch spring 236 engaging both the first clutch pack 234 and the second clutch pack 238. During operation, the clutch actuation assembly 242 receives inputs from the control assembly 50, generally in the form of pressurized hydraulic fluid, to independently adjust each clutch pack 234, 238 between its engaged and disengaged configurations.

The frame 314 of the clutch actuation assembly 242 is fixed relative to the body 18 of the loader 10 and includes a first wall 326a, and a second wall 326b parallel to and spaced a distance from the first wall 326a. Each wall 326a, b includes an inner surface 330a, b that faces the opposing wall 326a, b, and an annular groove 334a, b formed into each inner surface 330a, b (see FIG. 4). The frame 314 also defines a clutch axis 338 substantially aligned with the shaft axis 270, and a central plane 342 perpendicular to the clutch axis 338 and centered between the first wall 326a and the second wall 326b.

The clutch spring 236 of the actuation assembly 242 includes an annular spring positioned axially between and in contact with the first clutch pack 234 and the second clutch pack 238. During use, the clutch spring 236 is compressed between the two clutch packs 234, 238 and applies a force C1, C2 against both clutch packs 234, 238 in an axially outward direction (e.g., away from the central plane 342). More specifically, the force of the clutch spring 236 compresses each clutch pack 234, 238 between the spring 236 and the corresponding wall 326a, 326b of the frame 314. In the illustrated implementation, the compressive force C1, C2 applied by the clutch spring 236 is sufficient to place each clutch pack 234, 238 in the engaged configuration.

The first plunger assembly 318a of the actuation assembly 242 includes a first plunger 346a at least partially positioned within the annular groove 334a of the first wall 326a, a first pusher 350a axially movable together with the plunger 346a, and a thrust bearing 354a positioned between the pusher 350a and the plunger 346a to permit relative rotation therebetween.

The plunger 346a of the first plunger assembly 318a is substantially annular in shape being configured to contact and form one or more seals with the annular groove 334a of the first wall 326a to define a first hydraulic volume 358a therebetween. The plunger 346a is axially movable relative to the first wall 326a between a rest position (see FIG. 5a), where the first hydraulic volume 358a is a first size, and an actuated position (see FIG. 5b), where the first hydraulic volume 358a is a second size greater than the first size. During use, the first plunger 346a is movable between the rest position and the actuated position by introducing and removing hydraulic fluid from the first hydraulic volume 358a. More specifically, the plunger 346a may be moved from the rest position toward the actuated position by introducing hydraulic fluid into the first hydraulic volume 358a, while the plunger 346a may be moved from the actuated positioned toward the rest position by removing or draining hydraulic fluid from the first hydraulic volume 358a.

The pusher 350a of the first plunger assembly 318a includes an annular base 362a and one or more pins 366a each extending axially from the annular base 362a to produce a corresponding distal end 370a. When assembled, the pins 366a of the pusher 350a are configured to pass through apertures 374 formed in the plurality of clutch plates 302 allowing the distal end 370a thereof to contact the end plate 306. As such, axial movement of the pusher 350a relative to the central plane 342 is only transmitted to the end plate 306 (see FIG. 5b).

During use, the pusher 350a of the first plunger assembly 318a is axially movable relative to the frame 314 between a rest position (see FIG. 5a), in which the pins 366a do not engage the end plate 306a of the first clutch pack 234, and an actuated position (see FIG. 5b), in which the pins 366a engage the first end plate 306 and apply a counter-force thereto that at least partially overcomes the compressive force C1 of the clutch spring 236. In the illustrated implementation, the pusher 350a moves axially together with the plunger 346a as a unit while rotating about the clutch axis 338 independently thereof.

By operating the first plunger assembly 318a the first clutch pack 234 can be adjusted between the engaged configuration and the disengaged configuration by adding or removing hydraulic fluid from the first hydraulic volume 358a. More specifically, introducing hydraulic fluid into the first hydraulic volume 358a causes the plunger 346a and pusher 350a to move together as a unit towards their actuated positions (e.g., toward the central plane 342). By doing so, the distal ends 370a of the pins 366a of the pusher 350a engage the first end plate 306a and apply a counter-force thereto. As the first hydraulic volume 358a continues to fill with hydraulic fluid, the first end plate 306a is forced toward the central plane 342 by the pusher 350a overcoming the compressive force C1 of the clutch spring 236 and allowing the first clutch pack 234 to transition to the disengaged configuration. Once the first clutch pack 234 is disengaged, the clutch pack 234 will remain in the disengaged configuration so long as a sufficient volume of hydraulic fluid remains in the first hydraulic volume 358a.

To return the first clutch pack 234 to the engaged configuration, hydraulic fluid is removed from the first hydraulic volume 358a. By doing so, the biasing force of the clutch spring 236 forces the plunger 346a and pusher 350a away from the central plane 342 and toward their corresponding rest positions. This motion, in turn, causes the first end plate 306a to also move away from the central plane 342 allowing the compressive force C1 of the clutch spring 236 to be re-applied to the first clutch pack 234. Once the plunger 346a and pusher 350a reach their final rest positions, the distal ends 370a of the pins 366a no longer engage the first end plate 306a allowing the compressive force C1 to return the first clutch pack 234 to its engaged configuration.

In the illustrated implementation, the first plunger assembly 318a is configured to fail safe with the first clutch pack 234 is in the engaged configuration. More specifically, the force provided by the clutch spring 236 biases the plunger 346a and pusher 350a into their rest positions while also compressing the first clutch pack 234 into the engaged configuration.

The second plunger assembly 318b of the actuation assembly 242 is substantially similar to and operates in the same manner as the first plunger assembly 318a. As such, the details of the second plunger assembly 318b will not be described herein. The elements of the second plunger assembly 318b are described using the same reference numbers with a "b" suffix.

By operating the second plunger assembly 318b the second clutch pack 238 can be adjusted between the engaged configuration and the disengaged configuration by adding or removing hydraulic fluid from the second hydraulic volume 358b. More specifically, introducing hydraulic fluid into the second hydraulic volume 358b causes the second plunger 346b and second pusher 350b to move together as a unit towards their actuated positions (e.g., toward the central plane 342). By doing so, the distal ends 370b of the pins 366b of the pusher 350b engage the second end plate 306b and apply a counter-force thereto. As the second hydraulic volume 358b continues to fill with hydraulic fluid, the second end plate 306b is forced toward the central plane 342 by the pusher 350b overcoming the compressive force C2 of the clutch spring 236 and allowing the second clutch pack 238 to transition to the disengaged configuration. Once the second clutch pack 238 is disengaged, the clutch pack 238 will remain in the disengaged configuration so long as a sufficient volume of hydraulic fluid remains in the second hydraulic volume 358b.

To return the second clutch pack 238 to the engaged configuration, hydraulic fluid is removed from the second hydraulic volume 358b. By doing so, the biasing force of the clutch spring 236 forces the plunger 346b and pusher 350b away from the central plane 342 and toward their corresponding rest positions. This motion, in turn, causes the second end plate 306b to also move away from the central plane 342 allowing the compressive force C2 of the clutch spring 236 to be re-applied to the second clutch pack 238. Once the plunger 346b and pusher 350b reach their final rest positions, the distal ends 370b of the pins 366b no longer engage the second end plate 306b allowing the compressive force C2 to return the second clutch pack 238 to its engaged configuration.

In the illustrated implementation, the second plunger assembly 318b is configured to fail safe with the second clutch pack 238 is in the engaged configuration. More specifically, the force provided by the clutch spring 236 biases the second plunger 346b and pusher 350b into their rest positions while also compressing the second clutch pack 238 into the engaged configuration The output gear 218 of the drive train 62 is in operable communication with the first clutch pack 234, the second clutch pack 238, and at least one wheel assembly 58. More specifically, the output gear 218 includes a substantially cylindrical body 378 that is rotatably supported by the frame 314 for rotation about the clutch axis 338, and a set of external teeth 382. The external teeth 382 are configured to engage the external teeth 70 of the axle 98 allowing the exchange of force therebetween. More specifically, the output gear 218 is a lantern gear that directly meshes with the exterior teeth 70 of the axle 98 (see FIGS. 3 and 4). In the illustrated implementation, the output gear 218 engages the same set of external teeth 70 as the first flexible drive member 66 (described above) and is oriented such that the output gear 218 is positioned within the enclosed perimeter of the first flexible drive member 66 (see FIG. 3).

The drive train 62 of the loader 10 produces two drive paths through which force can be conveyed between the output shaft 82 of the motor 54 and the axle 98 of the wheel assembly 58. The first drive path generally extends from the input gear 222, to the first flexible drive member 250, to the first shaft 226, to the first clutch pack 234, to the output gear 218, and to the axle 98. Together, these elements produce a first drive ratio between the output shaft 82 and the axle 98. The second drive path generally extends from the input gear 222, to the second flexible drive member 258, to the second shaft 230, to the second clutch assembly 238, to the output gear 218, and to the axle 98. Together, the elements of the second drive path produce a second drive ratio between the output shaft 82 and the axle 98 that is different than the first drive ratio. In the illustrated implementation, both drive paths produce a positive drive ratio, that is, that the output shaft 82 of the motor 54 rotates in the same direction as the axle 98 during operation.

The second drive assembly 46b of the drive mechanism 14 is substantially similar to and operates in the same manner as the first drive assembly 46a. As such, the second drive assembly 46b will not be described in detail herein. All similar elements of the second drive assembly 46b are listed with the same reference number as the corresponding element of the first drive assembly 46a with an added prime symbol.

The hydraulic system 48 of the drive mechanism 14 includes pump 400 having an inlet 404 and an outlet 408, and a reservoir 412 in fluid communication with the inlet 404 of the pump 400. The hydraulic system 48 also includes a first feed line 416 extending between and in fluid communication with the pump 400 and the first hydraulic volume 358a of the first drive assembly 46a, a second feed line 420 extending between and in fluid communication with the pump 400 and the second hydraulic volume 458b of the first drive assembly 46a, a third feed line 424 extending between and in fluid communication with the pump 400 and the first hydraulic volume 458a' of the second drive assembly 46b, and a fourth feed line 428 extending between and in fluid communication with the pump 400 and the second hydraulic volume 458b' of the second drive assembly 46b (see FIG. 6. The hydraulic system 48 also includes a manifold 432 having one or more valves (not shown) to selectively direct the output of the pump 400 into the different feed lines 416, 420, 424, 428. Although not shown, the hydraulic system 48 may also include one or more safety valves to direct excess hydraulic fluid to the reservoir 412.

Figure 6:
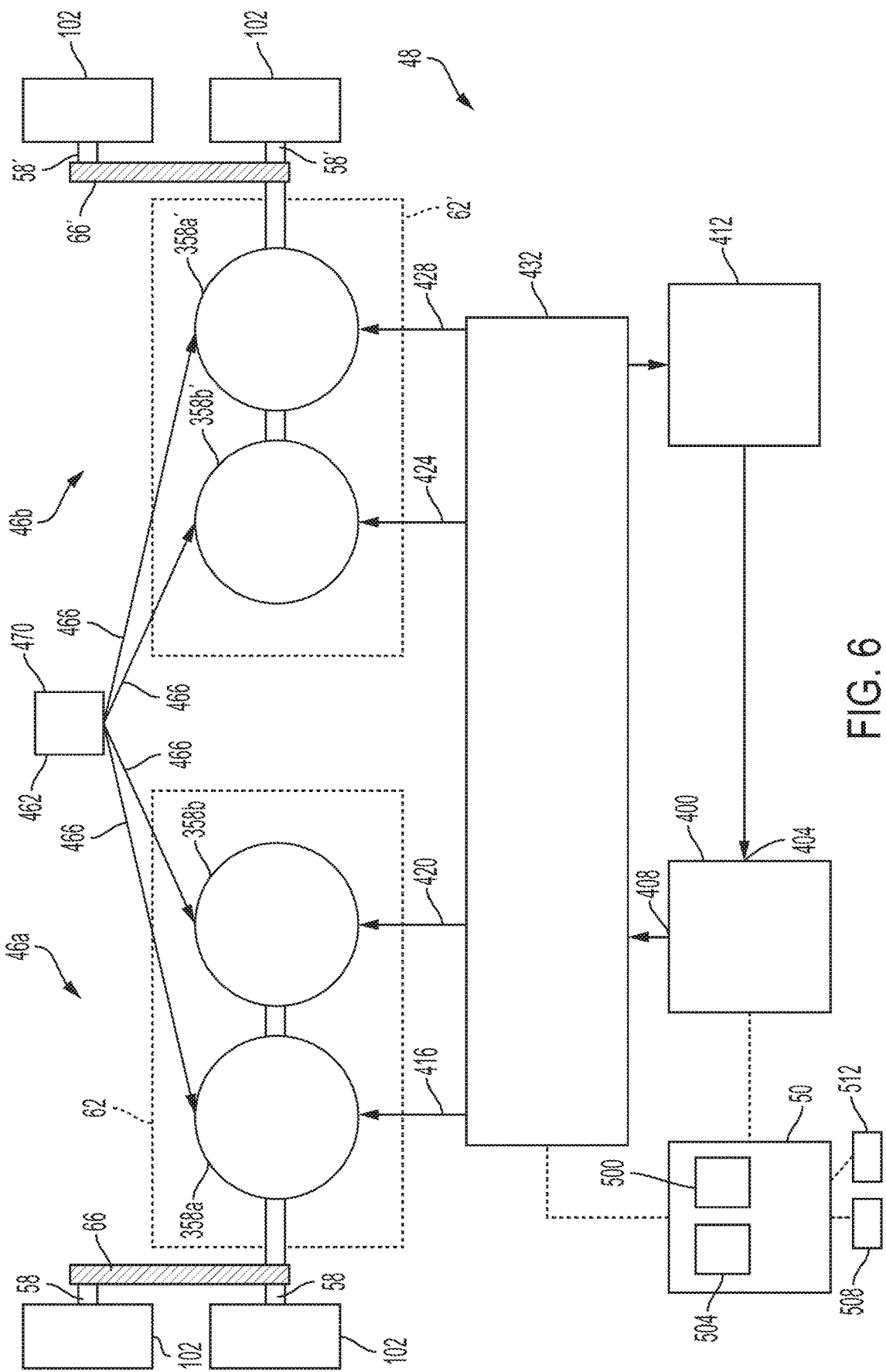
FIG. 6 is a schematic view of the hydraulic system of the skid-steer loader of FIG. 1.

Illustrated in FIG. 6, the hydraulic system 48 also includes a tow bypass 462 to permit the user to externally provide hydraulic fluid to hydraulic volumes 358a, 358b, 358a', 358b' of the first and second drive assemblies 46a, 46b. More specifically, the tow bypass 462 includes one or more channels 466 extending between an external access point 470, and each of the hydraulic volumes 358a, 358b, 358a', 358b' of the first and second drive assemblies 46a, 46b.

While the illustrated loader 10 includes a single hydraulic system 48 to operate both the first and second drive assemblies 46a, 46b; it is to be understood that in alternative implementations, independent hydraulic systems may be used to drive each drive assembly 46a, 46b independently. Furthermore, the hydraulic system 48 may also be in fluid communication with the lift arm 22 or other accessories attached to the loader 10. In implementations where a hydraulic motor is used, the hydraulic system 48 may also be used to control the hydraulic motor during use.

The control assembly 50 of the loader 10 includes a processor 500, a memory unit 504 in operable communication with the processor 500, and various user inputs 508. The processor 500 is also in operable communication with the pump 400, the manifold 432, the drive motor 54 of the first drive assembly 46a, and the drive motor 54' of the second drive assembly 46b. During use, the processor 500 receives signals from the various user inputs 508 and combines that information with one or more predetermined control algorithms to control the movement of the loader 100 across the support surface 26.

In the illustrated implementation, the user inputs 508 of the loader 100 may include, but are not limited to, the desired travel speed or throttle setting, the desired travel direction or steering position, the desired mode of operation, and the like. Such inputs may be provided through a series of user interfaces such as, but not limited to, foot pedals, joysticks, steering wheels, touchscreen interfaces, toggle switches, and the like (not shown).

The processor 500 of the loader 10 receives the user inputs 508 and outputs signals to the hydraulic system 48, the drive motor 54 of the first drive assembly 46a, and the drive motor 54' of the second drive assembly 46b to control the movement and operation of the loader 10. More specifically, the processor 500 outputs electrical signals to the drive motors 54, 54' establishing the rotational speed and direction of each motor's output shaft 82, 82', independently. The processor 500 also outputs signals to the pump 400 and manifold 432 of the hydraulic system 48 to direct the flow of hydraulic fluid into and out of the hydraulic volumes 358a, 358b, 358a', 358b' to independently change each drive assembly 46a, 46b between the different modes of operation. Together, the mode of operation, the speed of each motor's output shaft 82, 82', and the direction of rotation of each motor's output shaft 82, 82' influences the speed and direction of travel of the loader 10.

More specifically, the processor 500 of the control assembly 50 is configured to independently adjust the first drive assembly 46a and the second drive assembly 46b between the low-speed configuration, the high-speed configuration, the towing configuration, and the parking configuration based at least in part on the user inputs 508.

To place either drive assembly 46a, 46b in the low speed configuration, the processor 500 sends signals to the pump 400 and manifold 432 commanding them to direct hydraulic fluid into the first hydraulic volume 358a, 358a' and remove (or drain) hydraulic fluid from the second hydraulic volume 358b, 358b'. Doing so places the first clutch pack 234, 234' in the disengaged configuration (described above) and the second clutch pack 238, 238' in the disengaged configuration (described above). The resulting operational conditions cause force to only be transferred between the axle 98, 98' and the motor 54, 54' via the second drive path (described above) producing the second drive ratio therebetween.

To place either drive assembly 46a, 46b in the high speed configuration, the processor 500 sends signals to the pump 400 and manifold 432 commanding them to direct hydraulic fluid into the second hydraulic volume 358b, 358b' and remove (or drain) hydraulic fluid from the first hydraulic volume 358a, 358a'. Doing so places the first clutch pack 234, 234' in the engaged configuration and the second clutch pack 238, 238' in the disengaged configuration. The resulting operational layout causes force to be transmitted between the axle 98, 98' and the motor 54, 54' via the first drive path (described above) producing the first drive ratio, different than the first drive ratio, therebetween. In the illustrated implementation, the first drive ratio is smaller than the second drive ratio such that the first drive path produces more speed and less torque when compared to the second drive path.

To place either drive assembly 46a, 46b in the towing configuration, the processor 500 sends signals to the pump 400 and manifold 432 commanding them to direct hydraulic fluid into the first hydraulic volume 358a, 358a' and the second hydraulic volume 358b, 358b'. Doing so places the first clutch pack 234, 234' in the disengaged configuration and the second clutch pack 238, 238' in the disengaged configuration. The resulting operational layout causes no force to be transmitted between the axle 98, 98' and the motor 54, 54' allowing the axle 98, 98' to freely rotate about the housing axis 94.

In instances where the hydraulic system 48 is disabled (e.g., no hydraulic fluid can be fed into the hydraulic volumes 358a, 358a', 358b, 358b'), the user can introduce hydraulic fluid into each of the hydraulic volumes 358a, 358a', 358b, 358b' via the tow bypass 462. The tow bypass 462 allows the user to pressurize each hydraulic volume 358a, 358a', 358b, 358b' and disengaged all clutch packs 234, 238, 234', 238' allowing the loader 100 to be freely rolled over the support surface 26 or towed.

To place either drive assembly 46a, 46b in the park configuration, the processor 500 sends signals to the pump 400 and manifold 432 commanding them to remove or drain the hydraulic fluid from the first hydraulic volume 358a, 358a' and the second hydraulic volume 358b, 358b'. Doing so places the first clutch pack 234, 234' in the engaged configuration and the second clutch pack 238, 238' in the engaged configuration. The resulting operational layout transmits force between the axle 98, 98' and the motor 54, 54' along both the first and second drive paths. Since each drive path produces a different drive ratio, having both clutches engaged causes the axle 98, 98' to become locked or fixed relative to the body 18, acting like a parking brake. As described above, because each clutch pack 234, 234', 238, 238' fails safe into the engaged configuration, any sudden loss of power or hydraulic pressure results in drive assemblies 46a, 46b failing safe into the park configuration.

The processor 500 is also operable in an automatic configuration where the processor 500 automatically shifts each drive assembly 46a, 46b independently between the low speed configuration and the high speed configuration based on the operating conditions of the loader 10. In the automatic configuration, the processor 500 receives signals from one or more sensors 512 in addition to the user inputs 508, and places that information into a control algorithm to determine when to adjust the drive assemblies 46a, 46b between the high and low configurations. In the illustrated implementation, the one or more sensors 512 may include, but are not limited to, a ground speed sensor, one or more hydraulic pressure sensors, engine load sensors, engine speed sensors, and the like.

The invention claimed is:
1. A drive mechanism comprising:
   a frame;
   a motor coupled to the frame and having an output shaft rotatable about a motor axis;
   a drive axle mounted to the frame for rotation about an axle axis;
   a first drive path in operable communication with and establishing a first gear ratio between the output shaft and the drive axle;
   a second drive path in operable communication with and establishing a second gear ratio between the output shaft and the drive axle, the second gear ratio being different than the first gear ratio;
   a first clutch assembly adjustable between an engaged configuration, in which force is transmitted between the motor and the drive axle via the first drive path, and a disengaged configuration, in which force is not transmitted between the motor and the drive axle via the first drive path; and a second clutch assembly adjustable between an engaged configuration, in which force is transmitted between the motor and the drive axle via the second drive path, and a disengaged configuration, in which force is not transmitted between the motor and the drive axle via the second drive path.

2. The drive mechanism of claim 1, wherein the drive mechanism is operable in a first operating condition in which the first clutch is in the engaged configuration and the second clutch is in the disengaged configuration.

3. The drive mechanism of claim 2, wherein the drive mechanism is operable in a second operating condition in which the first clutch is in the disengaged configuration and the second clutch is in the engaged configuration.

4. The drive mechanism of claim 1, wherein the drive mechanism is operable in a neutral operating configuration in which the first clutch and the second clutch are in the disengaged configurations.

5. The drive mechanism of claim 1, wherein the drive mechanism is operable in a park operating configuration in which the first clutch is in the engaged configuration and the second clutch are in the engaged configuration.

6. The drive mechanism of claim 1, wherein the first clutch is biased toward the engaged configuration.

7. The drive mechanism of claim 6, wherein the second clutch is biased toward the engaged configuration.

8. The drive mechanism of claim 1, wherein the first drive path includes an input gear rotatable together with the output shaft of the motor, a first shaft driven by the input gear at a first speed, and an output gear in operable communication with the drive axle, and wherein the first clutch assembly is configured to selectively transfer force between the first shaft and the output gear.

9. The drive mechanism of claim 8, wherein the output gear is a lantern gear.

10. The drive mechanism of claim 8, wherein the second drive path includes a second shaft driven by the input gear at a second speed different than the first speed, and wherein the second clutch assembly is configured to selectively transfer force between the second shaft and the output gear.

11. The drive mechanism of claim 1, wherein motor axis and the axle axis are aligned.

12. The drive mechanism of claim 1, wherein motor and the drive axle are axially aligned.

13. A drive mechanism comprising:
a frame;
a motor having a housing fixedly coupled to the frame and an output shaft rotatable with respect to the housing about a motor axis;
a drive axle mounted to the frame for rotation with respect thereto about a drive axis, wherein the drive axis is aligned with the motor axis, and wherein the output shaft and the drive axle rotate at different speeds;
a first drive path in operable communication with and establishing a first gear ratio between the output shaft and the drive axle; and
a first clutch assembly adjustable between an engaged configuration, in which force is transmitted between the output shaft and the drive axle via the first drive path, and a disengaged configuration, in which force is not transmitted between the output shaft and the drive axle via the first gear set.

14. The drive mechanism of claim 13, wherein the drive axle includes a first end and a second end axially spaced from the first end, and wherein at least a portion of the motor is positioned axially between the first end and the second end of the drive axle.

15. The drive mechanism of claim 13, wherein the drive axle at least partially defines an axle volume therein, and wherein at least a portion of the motor is positioned within the axle volume.

16. The drive mechanism of claim 15, wherein the drive axle includes a shaft portion and a drum portion extending axially from the shaft portion, and wherein the drum portion at least partially defines the axle volume.

17. The drive mechanism of claim 13, further comprising:
a second drive path in operable communication with and establishing a second gear ratio between the output shaft and the drive axle, and wherein the second gear ratio is different than the first gear ratio; and
a second clutch assembly adjustable between an engaged configuration, in which force is transmitted between the output shaft and the drive axle via the second drive path, and a disengaged configuration, in which force is not transmitted between the output shaft and the drive axle via the second drive path.

* * * * *